(12) United States Patent
Miyano et al.

(10) Patent No.: US 11,606,048 B2
(45) Date of Patent: Mar. 14, 2023

(54) SHIFT RANGE CONTROL APPARATUS

(71) Applicant: DENSO CORPORATION, Kariya (JP)

(72) Inventors: Haruka Miyano, Kariya (JP); Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 204 days.

(21) Appl. No.: 16/910,390

(22) Filed: Jun. 24, 2020

(65) Prior Publication Data

US 2020/0321894 A1   Oct. 8, 2020

Related U.S. Application Data

(63) Continuation of application No. PCT/JP2018/046576, filed on Dec. 18, 2018.

(30) Foreign Application Priority Data

Dec. 27, 2017   (JP) .............................. JP2017-250567

(51) Int. Cl.
*H02P 6/15* (2016.01)
*F16H 61/32* (2006.01)

(52) U.S. Cl.
CPC ............. *H02P 6/153* (2016.02); *F16H 61/32* (2013.01); *F16H 2061/326* (2013.01)

(58) Field of Classification Search
CPC .. H02P 6/153; H02P 2203/03; H02P 2209/01; H02P 6/16; H02P 6/24; F16H 61/32; F16H 2061/326
See application file for complete search history.

(56) References Cited

U.S. PATENT DOCUMENTS

| 5,532,567 A * | 7/1996 | Iwasaki ............... H02P 25/0925 |
| | | 318/696 |
| 7,511,444 B2 | 3/2009 | Nakai et al. |
| 2003/0222617 A1 | 12/2003 | Nakai et al. |
| 2004/0066166 A1* | 4/2004 | Nakai ................... F16H 59/105 |
| | | 318/701 |
| 2006/0033464 A1 | 2/2006 | Nakai et al. |
| 2006/0197489 A1 | 9/2006 | Nakai et al. |
| 2007/0182353 A1 | 8/2007 | Kamio et al. |
| 2009/0193923 A1 | 8/2009 | Nakai et al. |
| 2011/0068730 A1 | 3/2011 | Nakai et al. |
| 2015/0222211 A1* | 8/2015 | Maruo ................ H02P 23/0027 |
| | | 318/612 |

* cited by examiner

*Primary Examiner* — Bickey Dhakal
(74) *Attorney, Agent, or Firm* — Nixon & Vanderhye P.C.

(57) ABSTRACT

A shift range control apparatus switches a shift range by controlling a motor. The shift range control apparatus includes an angle calculator, a speed calculator and a drive controller. The angle calculator calculates a motor angle based on a detected value of a rotational angle sensor. The speed calculator calculates a motor rotational speed based on the detected value of the rotational angle sensor. The drive controller executes a stationary phase energization control to stop the motor in response to the motor angle reaching a stationary phase energization start position. The drive controller sets a stationary energization phase being a stationary phase of the motor in the stationary phase energization control, according to the motor rotational speed when the motor angle reaches the stationary phase energization start position.

5 Claims, 8 Drawing Sheets

FIG. 5

| MOTOR SPEED SP | OFFSET AMOUNT P→D | OFFSET AMOUNT D→P |
|---|---|---|
| Hi | +4 | −4 |
| MidHi | +2 | −2 |
| Mid | 0 | 0 |
| MidLo | −2 | +2 |
| Lo | −4 | +4 |

FIG. 6

| MOTOR SPEED SP | OFFSET AMOUNT P→D | OFFSET AMOUNT D→P |
|---|---|---|
| Hi | +8 | −8 |
| MidHi | +6 | −6 |
| Mid | +4 | −4 |
| MidLo | +2 | −2 |
| Lo | 0 | 0 |

SHIFT RANGE CONTROL APPARATUS

CROSS REFERENCE TO RELATED APPLICATIONS

The present application is a continuation application of International Patent Application No. PCT/JP2018/046576 filed on Dec. 18 2018, which designated the U.S. and claims the benefit of priority from Japanese Patent Application No. 2017-250567 filed on Dec. 27, 2017. The entire disclosures of all of the above applications are incorporated herein by reference.

TECHNICAL FIELD

The present disclosure relates to a shift range control apparatus.

BACKGROUND

A motor control device may switch a shift range by controlling a motor in response to a shift range switching request from a driver. For example, a target position stop and holding process may be executed for stopping and holding the motor at a target position.

SUMMARY

The present disclosure describes a shift range control apparatus controlling a drive of a motor to a switch shift range. The shift range control apparatus includes an angle calculator, a speed calculator and a drive controller.

BRIEF DESCRIPTION OF DRAWINGS

Objects, features and advantages of the present disclosure will become more apparent from the following detailed description made with reference to the accompanying drawings. In the drawings:

FIG. 5 is a diagram explaining a map for setting an offset amount according to the first embodiment;

FIG. 6 is a diagram explaining a map for resetting the offset amount according to the first embodiment;

DETAILED DESCRIPTION

A target position stop and holding process may be executed to stop a motor at a target position. In a situation of executing the target position stop and holding process, when a motor rotational speed at the start of the target position stop and holding process is faster, an overshoot may occur and the motor may pass the target position. One or more embodiments of the present disclosure provides a shift range control apparatus for stopping a motor with high accuracy.

A shift range control apparatus according to the present disclosure switches a shift range by controlling a motor. The shift range control apparatus includes an angle calculator, a speed calculator and a drive controller. The angle calculator calculates a motor angle as a rotational speed of the motor based on a detected value of a rotational angle sensor detecting a rotational position of the motor. The speed calculator calculates a motor rotational speed as the rotational speed of the motor based on the detected value of the rotational angle sensor.

The drive controller starts the drive of the motor in response to switching of a target shift range. The drive controller executes the stationary phase energization control to stop the motor in response to the motor angle reaching the stationary phase energization start position. The stationary phase energization control continues the energization at a phase of the motor. The phase of the motor to which energization is continued in the stationary phase energization control is defined as a stationary energization phase. The drive controller sets the stationary phase energization as an energization phase of the motor in the stationary phase energization control, according to a motor rotational speed when the motor angle reaches the stationary phase energization start position. Therefore, it is possible to stop the motor at the target position with accuracy.

First Embodiment

Figure 1:
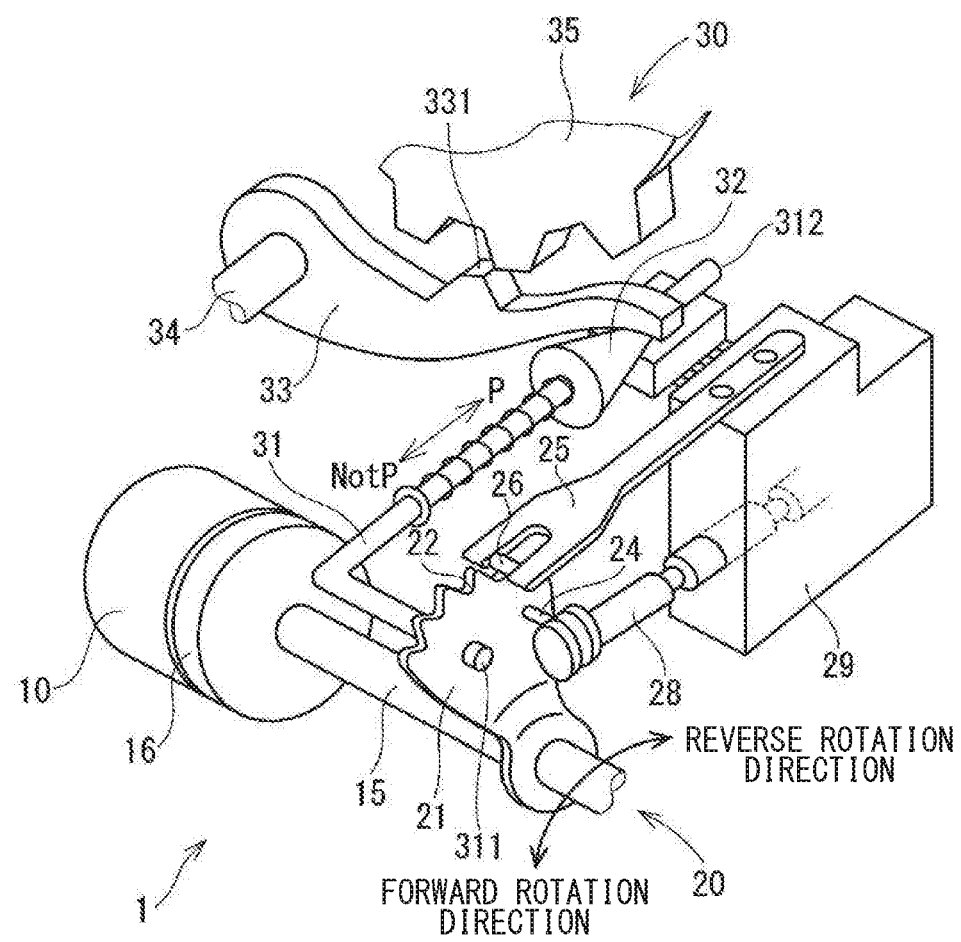
FIG. 1 is a perspective view showing a shift-by-wire system according to a first embodiment.
Figure 2:
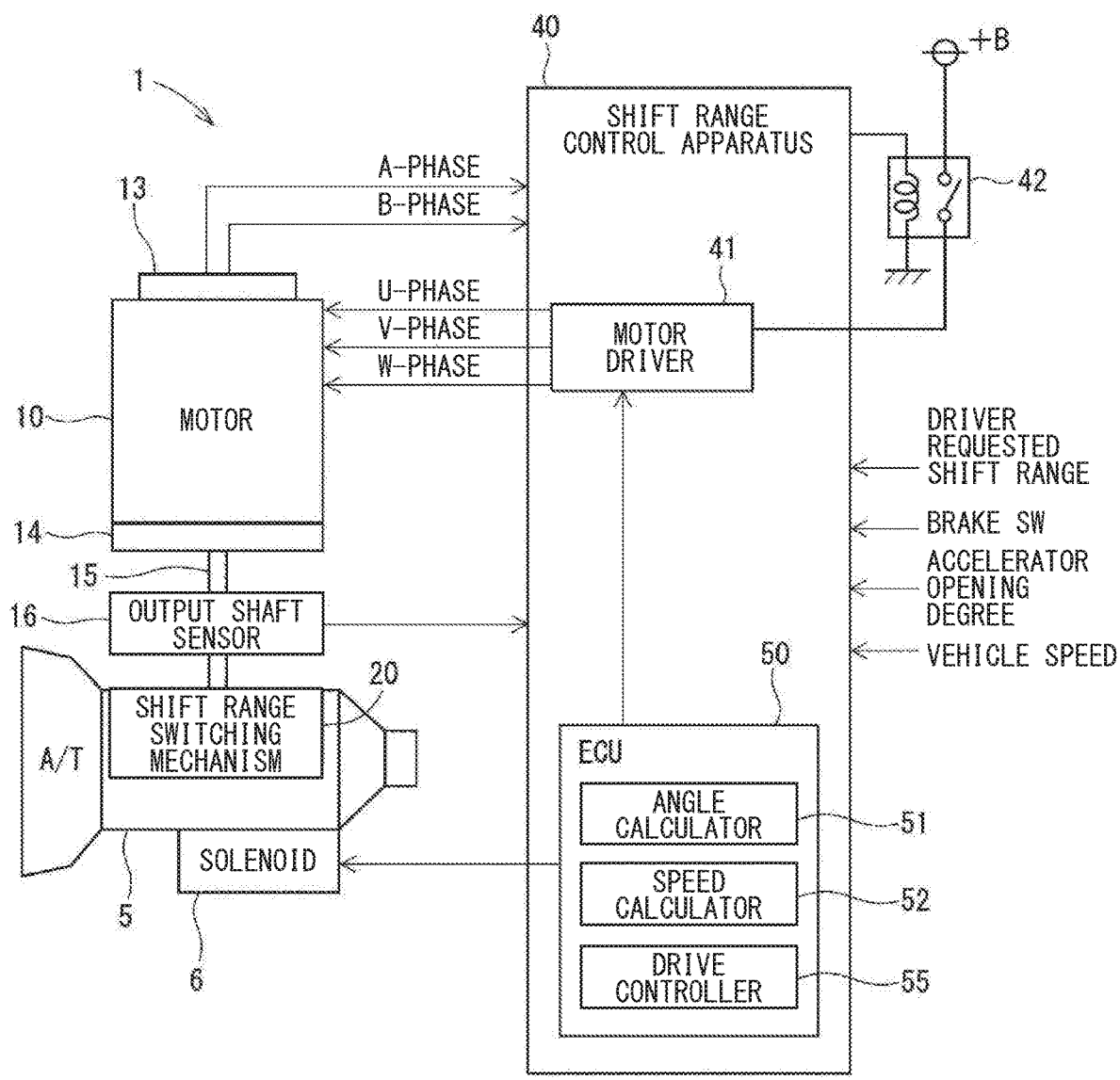
FIG. 2 is a block diagram showing a configuration of the shift-by-wire system according to the first embodiment.

The following describes a shift range control apparatus according to the present disclosure with reference to the drawings. As shown in FIGS. 1 and 2, a shift-by-wire system 1 as a shift range switching system includes a motor 10, a shift range switching mechanism 20, a parking lock mechanism 30, a shift range control apparatus 40, and the like. The motor 10 rotates when an electric power is supplied from a battery 45 (see FIG. 3) mounted on a vehicle (not shown), and functions as a driving source of the shift range switching mechanism 20. The motor 10 is, for example, an SR motor. The motor 10 includes a winding set 11. The winding set 11 has a U-phase coil 111, a V-phase coil 112, and a W-phase coil 113. The motor 10 may not be limited to the SR motor. The motor 10 may be any type of motor such as a DC brushless motor.

As shown in FIG. 2, an encoder 13 functioning as a rotation angle sensor detects a rotational position of a not-shown rotor of the motor 10. The encoder 13 is, for example, a magnetic rotary encoder, and includes a magnet that rotates integrally with the rotor, a Hall IC for magnetic detection, and the like. The encoder 13 outputs pulse signals of the A-phase and the B-phase at every predetermined angle in synchronization with the rotation of the rotor.

A speed reducer 14 is provided between a motor shaft of the motor 10 and an output shaft 15 and outputs the rotation of the motor 10 to the output shaft 15 after speed reduction. As a result, the rotation of the motor 10 is transmitted to the shift range switching mechanism 20. The output shaft 15 is provided with an output shaft sensor 16 for detecting an angle of the output shaft 15. The output shaft sensor 16 is, for example, a potentiometer.

As shown in FIG. 1, the shift range switching mechanism 20 includes a detent plate 21, a detent spring 25, and the like, and transmits a rotational driving force output from the speed reducer 14 to a manual valve 28 and a parking lock mechanism 30.

The detent plate 21 is stationary to the output shaft 15 and driven by the motor 10. In the present embodiment, a direction in which the detent plate 21 is away from a base of the detent spring 25 is defined as a forward rotation direction and a direction approaching the base portion is defined as a reverse rotation direction.

The detent plate 21 has a pin 24 protruding in parallel with the output shaft 15. The pin 24 is connected to a manual valve 28. When the detent plate 21 is driven by the motor 10, the manual valve 28 reciprocates in the axial direction. The shift range switching mechanism 20 converts a rotational motion of the motor 10 into a linear motion and transmits the linear motion to the manual valve 28. The manual valve 28 is provided in the valve body 29. The reciprocating movement of the manual valve 28 in the axial direction switches hydraulic pressure supply paths to a hydraulic clutch (not shown) to switch an engagement state of the hydraulic clutch, so that the shift range is switched.

At the detent spring 25 of the detent plate 21, four recess portions 22 for holding the manual valve 28 at positions corresponding to the respective ranges are disposed. The recess portions 22 correspond to the respective ranges of D (drive), N (neutral), R (reverse), and P (parking) from a base side of the detent spring 25.

The detent spring 25 is an elastically deformable plate-like member, and is provided with a detent roller 26 at a tip of the detent spring 25. The detent roller 26 fits into one of the recess portions 22. The detent spring 25 biases the detent roller 26 toward a rotation center of the detent plate 21. When a rotational force equal to or more than a predetermined value is applied to the detent plate 21, the detent spring 25 is elastically deformed, and the detent roller 26 moves on the recess portions 22. When the detent roller 26 is fitted into any one of the recess portions 22, the swinging motion of the detent plate 21 is regulated, an axial position of the manual valve 28 and a state of the parking lock mechanism 30 are determined, and the shift range of an automatic transmission 5 is stationary.

The parking lock mechanism 30 includes a parking rod 31, a conical member 32, a parking lock pawl 33, a shaft part 34 and a parking gear 35. The parking rod 31 is formed in a substantially L-shape, and one end 311 of the parking rod 31 is stationary to the detent plate 21. The other end 312 of the parking rod 31 is provided with the conical body 32. A diameter of the conical body 32 decreases toward the other end 312. When the detent plate 21 swings in a reverse rotation direction, the conical body 32 moves in a direction of an arrow P.

The parking lock pawl 33 abuts a conical surface of the conical body 32, and a projection portion 331 that can mesh with the parking gear 35 is provided at the parking gear 35 of the parking lock pawl 33 that is provided so as to be swingable about the shaft portion 34. When the detent plate 21 rotates in the reverse rotation direction and the conical body 32 moves in a direction of an arrow P, the parking lock pawl 33 is pushed up, and the projection portion 331 and the parking gear 35 mesh with each other. When the detent plate 21 rotates in a forward rotational direction and the conical body 32 moves in a direction of an arrow NotP, the engagement between the projection portion 331 and the parking gear 35 is released.

The parking gear 35 is provided at an axle (not shown) to be capable of engagement with the protrusion 331 of the parking lock pawl 33. When the parking gear 35 and the projection portion 331 are engaged with each other, the rotation of the axle is regulated. When the shift range is a NotP range other than the P, the parking gear 35 is not locked by the parking lock pawl 33, and the rotation of the axle is not hindered by the parking lock mechanism 30. When the shift range is the P range, the parking gear 35 is locked by the parking lock pawl 33, and the rotation of the axle is regulated.

Figure 3:
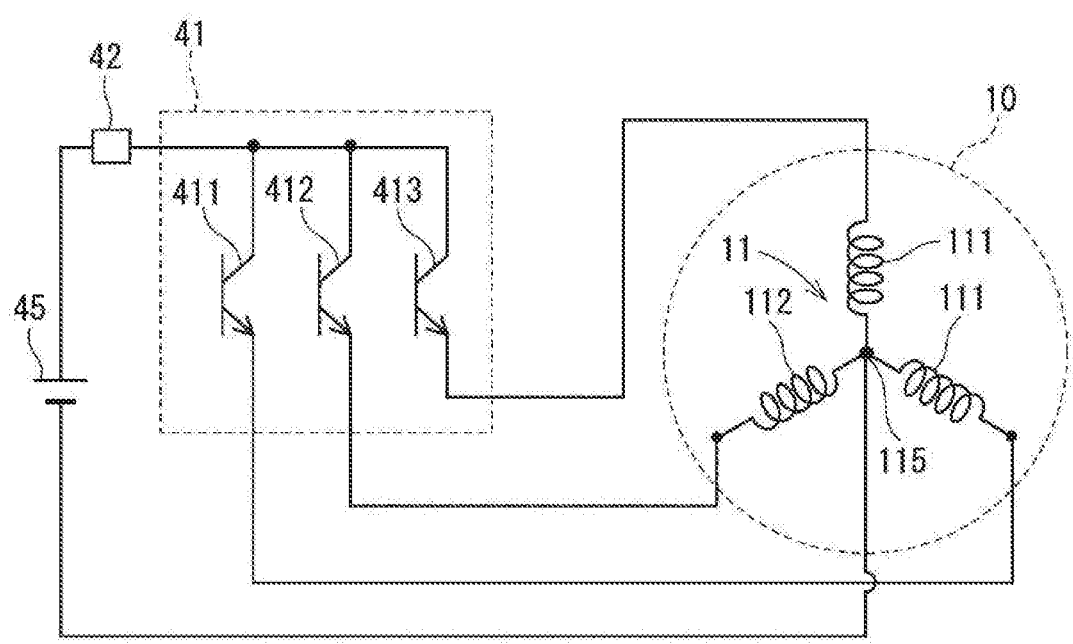
FIG. 3 is a circuit diagram showing a motor and a motor driver according to the first embodiment.

As shown in FIGS. 2 and 3, the shift range control apparatus 40 includes motor driver 41, an ECU 50, and the like. As shown in FIG. 3, the motor driver 41 includes switching elements 411 to 413. The U-phased switching element 411 is connected to one end of the U-phase coil 111. The V-phase switching element 412 is connected to one end of the V-phase coil 112. The W-phase switching element 413 is connected to one end of the W-phase coil 113. The respective other ends of the coils 111 to 113 are connected at a connection portion 115. The connection portion 115 is connected to a ground. The switching elements 411 to 413 are MOSFETs. The switching elements 411 to 413 may be other elements such as IGBTs.

A motor relay 42 is provided between the motor driver 41 and a battery 45. The supply and cutoff of the electric power from the battery 45 are switched by controlling a turn-on or turn-off operation of the motor relay 42.

As shown in FIG. 2, the ECU 50 is configured by a microcontroller, and includes, for example, a CPU, a ROM, a RAM, an I/O, and a bus line for connecting those configurations. The processing in the ECU 50 may be software processing by allowing a CPU to execute a program stored in advance in a tangible memory device such as a ROM (that is, a readable non-transitory tangible recording medium), or hardware processing by dedicated electronic circuits.

The ECU 50 controls the turn-on or turn-off operation of the switching elements 411 to 413 to drive the motor, such that the shift range of the shift range switching mechanism 20 matches with the target shift range. The ECU 50 controls the drive of a transmission hydraulic control solenoid 6 based on a vehicle speed, an accelerator opening degree, a driver requested shift range, and the like. The shift stage is controlled by controlling the transmission hydraulic control solenoid 6. The shift stage may also be referred to as a gear position, a gear stage, a shift range or a transmission stage. The transmission hydraulic control solenoids 6 are provided in number in accordance with the number of gear stages, or the like. In the present embodiment, a single ECU 50 controls the drive of the motor 10 and the solenoid 6, but a motor ECU for controlling the motor 10 and an AT-ECU for controlling the solenoid may be separated from each other. The following mainly describes the drive control of the motor 10.

An angle calculator 51 calculates an actual count value θen, which is a count value of the encoder 13, based on the pulses of the A-phase and the B-phase output from the encoder 13. The encoder count value θen is a value corresponding to the rotational position of the motor 10 and corresponds to a "motor angle". The speed calculator 52 calculates the motor rotational number as the rotational speed of the motor 10, based on the encoder count value θen. The motor rotational speed is the motor rotational number. However, the motor rotational speed may also be, for example, a rotation angular speed.

Figure 7:
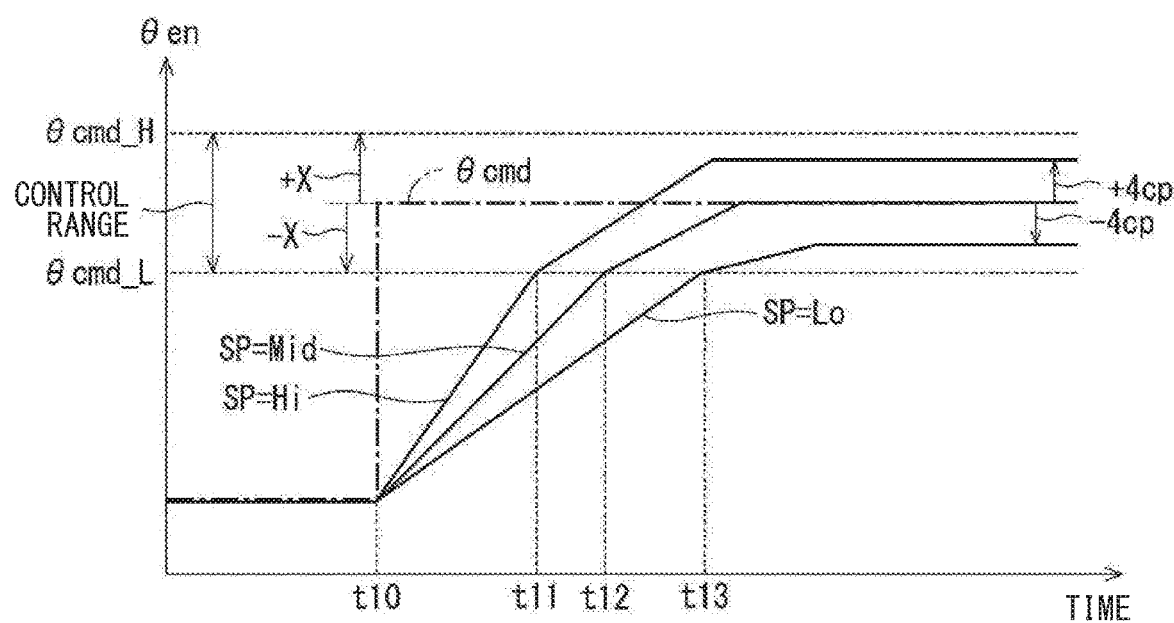
FIG. 7 is a time chart describing a stationary energization phase setting according to the first embodiment.

The drive controller 55 switches the energization phase to control the motor 10. The switching of the energization phase is executed by, for example, a feedback control, so that the encoder count value θen reaches a control range including a target count value θcmd. The target count value θcmd is set according to the requested shift range. In the present embodiment, the target count value θcmd corresponds to a motor angle target value. As illustrated in FIG. 7, the control range is a range from a control lowest limit value θcmd_L to a control highest limit value θcmd_H. The control lowest limit value θcmd_L and the control highest limit value θcmd_H are respectively represented by the following mathematical equations (1), (2).

$$\theta cmd\_L = \theta cmd - X1 \quad (1)$$

$$\theta cmd\_H = \theta cmd + X2 \quad (2)$$

The values X1, X2 in the mathematical equations are properly set according to, for example, the spring force of the detent spring 25, the shape of the detent plate 21, a parking lock guaranteed range, or a hydraulic pressure guaranteed range of each range. The value of X1 and the value of X2 are 9. Although the respective values of X1 and X2 are identical, they may be different. The values may also be different for different ranges.

In a situation where the shift range is shifted toward D-range and the encoder count value θen reaches the control lowest limit value θcmd_L or larger, the stationary phase energization control is executed to stop the motor 10. The stationary phase energization control continues the energization to an identical phase. In the following, the energization phase in the stationary phase energization control may also be referred to as a stationary energization phase. In a situation where the shift range is shifted toward P-range and the encoder count value θen reaches the control highest limit value θcmd_H or lower, the stationary phase energization control is executed. In a situation of switching the shift range toward the D-range, the control lowest limit value corresponds to a stationary phase energization start position. In a situation of switching the shift range toward the P-range, the control highest limit value θcmd_H corresponds to a stationary phase energization start position. The following describes the switching of the shift range toward the D-range.

In order to achieve the responsiveness and stability of the motor 10, the motor 10 is surely stopped in the control range by holding the energization to the identical phase for a certain time period. When the stationary energization phase is uniquely set according to the target count value θcmd regardless of the motor rotational number N, the stop position may vary according to the motor rotational number N. In a situation where the motor rotational number N is larger, overshoot may occur. In a situation where the motor rotational number N is smaller, the target may not be reached. When the motor rotational number N is larger and has passed the target count value θcmd, the motor 10 rotates until the next stability point of the energization phase.

Figure 4:
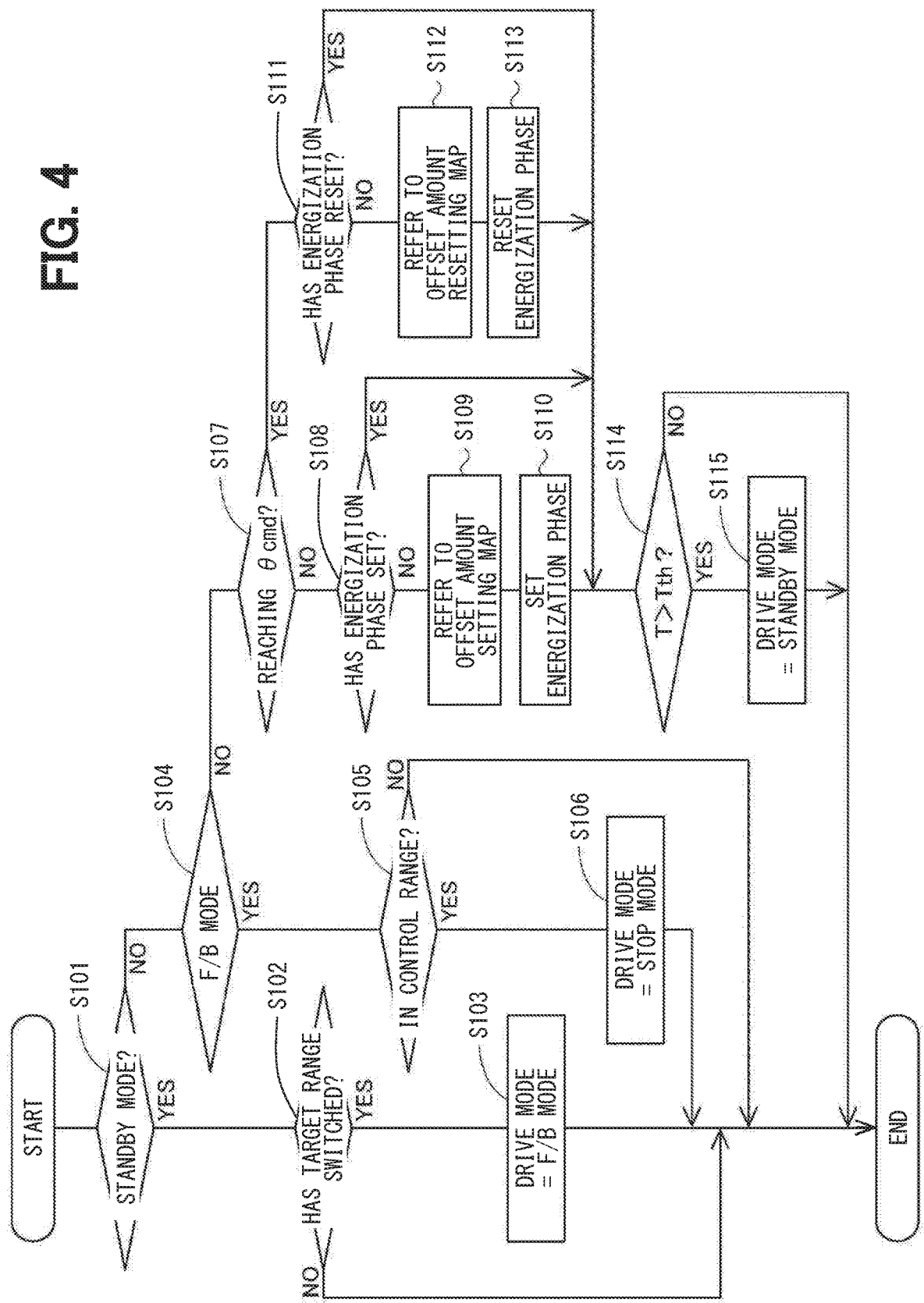
FIG. 4 is a flowchart showing a motor control process according to the first embodiment.

The stationary energization phase is set according to the motor rotational number N. A motor control process in the present embodiment is described based on a flowchart in FIG. 4. The processing is executed by the drive controller 55 at a predetermined time period (for example, every 1 millisecond). The drive mode after the initialization of the microcontroller is set as a standby mode.

In S101, the drive controller 55 determines whether the drive mode is the standby mode. In a situation where it is determined that the drive mode is not the standby mode, the processing is shifted to S104. In a situation where it is determined that the drive mode is the standby mode (S101: YES), the processing is shifted to S102.

In S102, the drive controller 55 determines whether the target shift range has been switched. In a situation where the target shift range has not been switched (S102: NO), the routine is terminated. In a situation where it is determined that the target shift range has been switched (S102: YES), the processing is shifted to S103.

In S103, the drive controller 55 switches the drive mode to the feedback mode. In the drawing, the feedback is referred to as "F/B". In the feedback mode, the drive of the motor 10 is controlled by the feedback control or the like such that the encoder count value θen reaches the control range having the target count value θcmd.

In S104, the drive controller 55 determines whether the drive mode is the feedback mode. In a situation where it is determined that the drive mode is not the feedback mode (in other words, the drive mode is the stop mode), the processing is shifted to S107. In a situation where it is determined that the drive mode is the feedback mode (S104: YES), the processing is shifted to S105.

In S105, the drive controller 55 determines whether the encoder count value θen reaches the control range having the target count value θcmd. In a situation where the absolute value of the difference between encoder count value θen and the target count value θcmd is 9 or lower, it is determined that the encoder count value θen has reached the control range. In a situation where it is determined that the encoder count value θen has not reached the control range (S105: NO), the feedback mode is continued. In a situation where it is determined that the encoder count value θen reaches the control range (S105: YES), the processing is shifted to S106, and the drive mode is switched to the stop mode.

In S107 in a situation of the control mode being the stop mode, the drive controller 55 determines whether the encoder count value θen has reached the target count value θcmd. In a situation where it is determined that the encoder count value θen has reached the target count value θcmd (S107: YES), the processing is shifted to S111. In a situation where the encoder count value θen has not reached the target count value θcmd (S107: NO), the processing is shifted to S108.

In S108, the drive controller 55 determines whether the stationary energization phase has been set. In a situation where it is determined that the stationary energization phase has been set (S108: YES), the processing is shifted to S114. In a situation where it is determined that the stationary energization phase has not been set (S108: NO), the processing is shifted to S109.

In S109, the drive controller 55 refers to an offset amount setting map illustrated in FIG. 5, and determines the offset amount based on the motor rotational number N at the time of entering or rushing into the stop mode. As illustrated in FIG. 5, the motor rotational number N is divided into five stages. From the high-speed side, Hi, MidHi, Mid, MidLo and Lo are stated in order. The offset amount at the time of switching the shift range from the P-range toward the D-range is set to +4 counts when the motor rotational number N is in Hi. The offset amount is set to +2 counts when the motor rotational number N is in MidHi. The offset amount is set to 0 count when the motor rotational number N is in Mid. The offset amount is set to −2 counts. The offset amount is set to −4 counts when the motor rotational number N is in Lo. The offset amount at the time of switching the shift range from the D-range to the P-range, the motor rotational number N is set to −4 counts when the motor rotational number N is in Hi. The offset amount is set to −2 counts when the motor rotational number N is in MidHi. The offset amount is set to 0 count when the motor rotational number N is in Mid. The offset amount is set to +2 counts when the motor rotational number N is in MidLo. The offset amount is set to +4 counts when the motor rotational number N is in Lo. The number of steps, threshold value, offset amount or the like may be arbitrarily set. The offset amount may be different depending on the target shift range. The same also applies to the offset amount resetting map described hereinafter. The number of steps and the threshold value may be different between the offset amount setting map in FIG. 5 and the offset amount resetting map in FIG. 6.

In S110, the drive controller 55 sets the stationary energization phase based on the target count value θcmd and the offset amount. The following describes an example of setting the stationary energization phase.

In S111 when it is determined that the target count value θcmd has been reached (S107: YES), the drive controller 55 determines whether the stationary energization phase has been reset. In a situation where the stationary energization phase has been reset (S111: YES), the processing is shifted to S114. In a situation where the stationary energization phase has not been reset (S111: NO), the processing is shifted to S112.

In S112, the drive controller 55 refers to the offset amount resetting map illustrated in FIG. 6 and corrects the offset amount based on the motor rotational number N at the time of reaching the target count value θcmd. As illustrated in FIG. 6, the offset amount at the time of switching the shift range from the P-range toward the D-range is set to +8 when the motor rotational number N is in Hi. The offset amount is set to +6 when the motor rotational number N is in MidHi. The offset amount is set to +4 when the motor rotational number is in Mid. The offset amount is set to +2 when the motor rotational number N is in MidLo. The offset amount is set to 0 when the motor rotational number N is in Lo. The offset amount at the time of switching the shift range from the D-range toward the P-range is set to −8 when the motor rotational number N is in Hi. The offset amount is set to −6 when the motor rotational number N is in MidHi. The offset amount is set to −4 when the motor rotational number N is in Mid. The offset amount is set to −2 when the motor rotational number N is in MidLo. The offset amount is set to 0 when the motor rotational number N is in Lo.

In S113, the drive controller 55 resets the stationary energization phase based on the target count value θcmd and the offset amount. The following describes an example of resetting the stationary energization phase.

In S114, the drive controller 55 determines whether an elapsed time T exceeds an energization continuation time Tth. The elapsed time T is a time elapsed from a situation where the drive mode is switched to the stop mode. The energization continuation time Tth is set according to the time required to certainly stop the motor 10. In a situation where it is determined that the elapsed time T has not exceeded the energization continuation time Tth (S114: NO), the stop mode is continued. In a situation where it is determined that the elapsed time T has exceeded the energization continuation time Tth (S114: YES), the processing is shifted to S115. In S115, the drive controller 55 sets the drive mode to the standby mode, and turns off the switching elements 411 to 413 to turn off the energization to the motor 10.

The following describes the motor control based on a time chart in FIG. 7. FIG. 7 illustrates a situation where a motor speed SP is in Lo, Mid, or Hi. In the drawing, the count number of the encoder 13 is "cp". For simplicity, the motor 10 rotates at a constant speed from the start of driving motor to the time of entering or rushing into the control range and from the time of entering or rushing into the control range to the stop of the motor in FIG. 7.

As illustrated in FIG. 7, when the target shift range is switched at time t10, the target count value θcmd corresponding to the target shift range is set, and the drive of the motor 10 starts. When the motor rotational number N is in Mid, the motor control enters or rushes into the control range at time t12, and the stationary energization phase is set to an energization phase according to the target count value θcmd. When the motor rotational number N is in Lo, the motor control enters or rushes into the control range at time t13. The stationary energization phase is set to a phase at a retard angle side −4 counts behind the energization phase corresponding to the target count value θcmd. When the motor speed SP is in Hi, the motor control enters or rushes into control range at time t11, the stationary energization phase is set to a phase at a lead angle side +4 counts from the energization phase corresponding to the target count value θcmd. In FIG. 7, the motor rotational number N at the time of reaching the target count value θcmd is assumed to be in Mid, and the stationary energization phase after resetting is identical to the phase before resetting.

Figure 8:
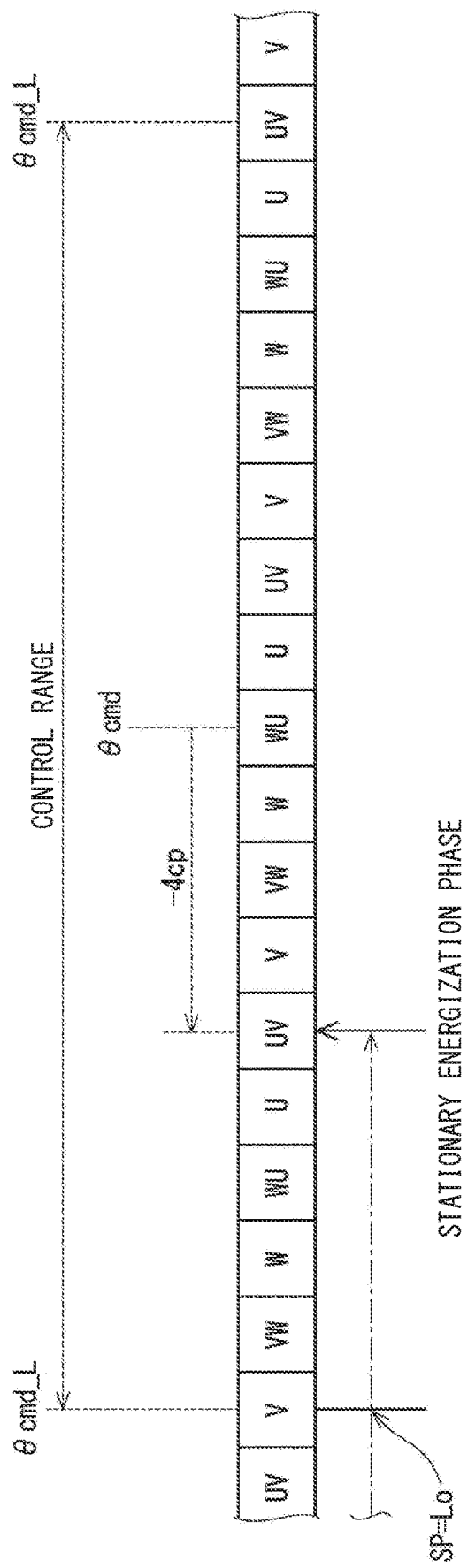
FIG. 8 is a diagram describing an example of the stationary energization phase setting according to the first embodiment.
Figure 9:
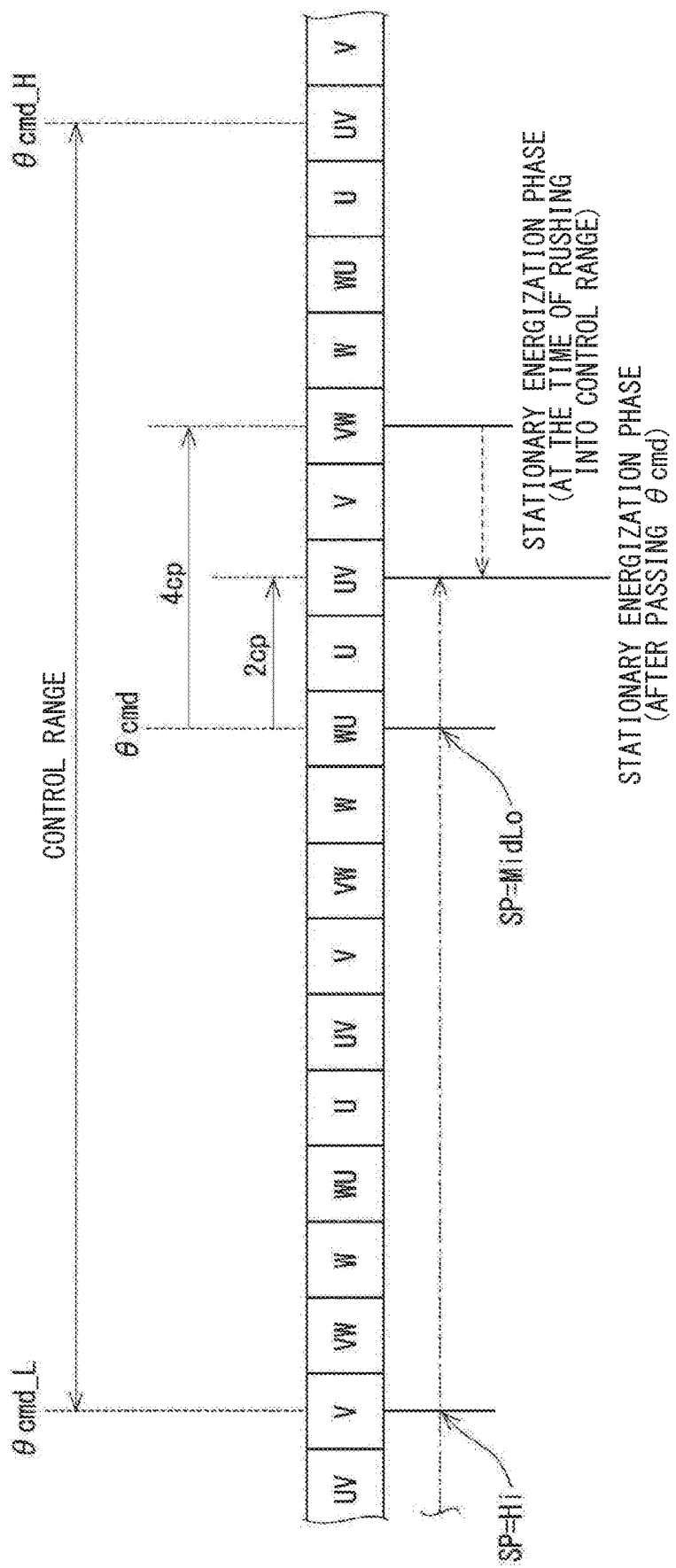
FIG. 9 is a diagram describing another example of the stationary energization phase setting according to the first embodiment.

An example of setting the stationary energization phase is described based on FIGS. 8, 9. FIGS. 8, 9 schematically illustrates a state in which the rotational position of the motor 10 changes. FIGS. 8, 9 illustrate that a corresponding energization phase corresponds to one square, and illustrate that one square corresponds to 1 count of the encoder count value θen. The transition of the encoder count value θen along with the rotation of the motor 10 is indicated by a dashed-line arrow. The encoder count value θen changes from the left side to the right side of the drawing. The right side of the drawing is a lead angle side, and the left side of the drawing is a retard angle side. The energization phase corresponding to the target count value θcmd corresponds to a WU phase. In a situation where the energization phase corresponding to the target count value θcmd is one phase, the energization phase may also be adjusted to two-phase energization through shifting the energization phase by +1 or −1.

FIG. 8 illustrates a situation where the motor rotational number N is in Lo at the time of entering or rushing into the control range. Since the motor rotational number N at the time of entering or rushing into the control range is in Lo, the offset amount is set to −4. The stationary energization phase is shifted to the retard angle side by 4 counts (in other words, −4 cp) from the WU-phase corresponding to the target count value θcmd, and the stationary energization phase is set to UV-phase. In a reference example, in a situation where the WU-phase corresponding to the target count value θcmd, when the motor rotational number N at the time of entering the control range is slow, it is possible that the motor stops 6 counts before the target count value θcmd. In the present embodiment, it is possible that the motor stops at a position closer to the target count value θcmd by setting the energization phase according to the motor rotational number N at the time of entering or rushing into the control range.

FIG. 9 illustrates a situation where the motor rotational number N is in Hi at the time of entering or rushing into the control range. Since the motor rotational number N is in Hi at the time of entering or rushing into the control range, the offset amount is set to +4. The stationary energization phase is shifted to the lead angle side by 4 counts from the WU-phase corresponding to the target count value θcmd, and the stationary energization phase is set to VW-phase.

In a situation where the motor rotational number N is in MidLo at the time of the encoder count value θen reaching the target count value θcmd, the offset amount is reset to +2. The stationary energization phase is changed from the VW-phase to the UV-phase as indicated by a dashed arrow.

In other words, the drive controller 55 shifts the stationary energization phase to a lead angle side with increase in the rotational speed.

In a reference example, in a situation where the WU-phase corresponding to the target count value θcmd is set as the stationary energization phase, it is possible that the motor rotates to 6 counts in advance from the target count value θcmd when the motor passes the target count value θcmd without stopping at the target count value θcmd. In the present embodiment, it is possible to stop the motor at a position closer to the target count value θcmd by setting the energization phase according to the motor rotational number N at the time of entering or rushing into the control range. It is also possible to stop the motor 10 properly by resetting the energization phase according to the motor rotational number N at the time of reaching the target count value θcmd.

The shift range control apparatus 40 drives the motor 10 to switch the shift range, and includes the angle calculator 51, the speed calculator 52 and the drive controller 55. The angle calculator 51 calculates the encoder count value θen as the motor angle being the rotational angle of the motor 10, according to a detected value of the encoder 13 for detecting the rotational position of the motor 10. The speed calculator 52 calculates the motor rotational number N as the rotational speed of the motor 10, according to the detected value of the encoder 13.

The drive controller 55 starts to drive the motor 10 when the target shift range is switched. The drive controller 55 executes the stationary phase energization control to continue the energization to the identical phase for stopping the motor 10, when the encoder count value θen reaches the stationary phase energization start position. The drive controller 55 sets the stationary energization phase as an energization phase in the stationary phase energization control, according to the motor rotational number N when the encoder count value θen reaches the stationary phase energization start position. Therefore, it is possible to stop the motor 10 at the target position with accuracy.

In the stationary phase energization control, the drive controller 55 sets the stationary energization phase in the lead angle side in a situation where the motor rotational number N is relatively large. Therefore, it is possible to control the motor with better responsiveness without exceeding the control range.

The drive controller 55 resets the stationary energization phase, according to the motor rotational number N at the time where the encoder count value θen reaches the target count value θcmd set according to target shift range. Therefore, it is possible to stop the motor 10 at the target position with accuracy.

Other Embodiments

In the above embodiment, when the rotational speed of the motor is slow, the stationary energization phase is set at the retard angle side of the energization phase corresponding to the target count value. In the other embodiments, without changing the stationary energization phase to the retard angle side, it may also be possible to set the stationary energization phase to the lead angle side of the energization phase corresponding to the target count value in a situation where the motor rotational speed at the time of entering or rushing into the control range is faster than a predetermined speed. The predetermined speed is a speed to a certain degree that the motor passes the target value without stopping at the target count value, even when the energization phase according to the target count value is energized.

In this embodiment, an encoder is used as the rotation angle sensor for detecting the rotation angle of the motor. In a different embodiment, the rotation angle sensor may be of any types such as a resolver, rather than an encoder. In the above embodiment, a potentiometer may be, for example, the output shaft sensor. In a different embodiment, the output shaft sensor may be any type of sensor. The output shaft sensor may be omitted.

In the above embodiments, the detent plate is provided with four troughs. In a different embodiment, the number of troughs is not limited to four and may be any number. For example, two troughs corresponding to a P range and a NotP range other than the P range may be provided. The shift range switching mechanism, the parking lock mechanism, and the like may be different from those of the above embodiments.

In the embodiment described above, a speed reducer is provided between the motor shaft and the output shaft. Although the details of the speed reducer are not mentioned in the embodiments described above, any configuration may be adopted, for example, a cycloid gear, a planetary gear, a spur gear for transmitting a torque from a speed reduction mechanism substantially coaxial with the motor shaft to the drive shaft, or a combination of those gears. In a different embodiment, the speed reducer between the motor shaft and the output shaft may be omitted, or a mechanism other than the speed reducer may be provided. As described above, the present disclosure is not limited to the embodiments described above, and can be implemented in various forms without departing from the spirit of the present disclosure.

The control unit (may also be referred to as the controller) and the technique according to the present disclosure may be achieved by a dedicated computer provided by constituting a processor and a memory programmed to execute one or more functions embodied by a computer program. Alternatively, the control unit and the technique according to the present disclosure may be achieved by a dedicated computer provided by constituting a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. Further, the computer program may store a computer-readable non-transitional tangible recording medium as an instruction to be executed by the computer.

The present disclosure has been described in accordance with the embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A shift range control apparatus for switching a shift range by controlling a drive of a motor, the shift range control apparatus comprising:

an angle calculator configured to calculate a motor angle as a rotational angle of the motor based on a detected value of a rotational angle sensor detecting a rotational position of the motor;

a speed calculator configured to calculate a motor rotational speed as a rotational speed of the motor based on the detected value of the rotational angle sensor; and a drive controller configured to:
  start the drive of the motor in response to switching of a target shift range, and
  execute a stationary phase energization control to
    set an energization phase selected from a group consisting of a plurality of energization phases as a stationary energization phase of the motor, according to the rotational speed of the motor, and
    stop the motor in response to the motor angle reaching a stationary phase energization start position by continuing energization to the stationary energization phase set by the drive controller until stop of the motor, wherein the rotational speed of the motor is a rotational speed at a time in which the motor angle reaches the stationary phase energization start position.

2. The shift range control apparatus according to claim 1, wherein the drive controller is further configured to shift the stationary energization phase to a lead angle side with increase in the motor rotational speed.

3. The shift range control apparatus according to claim 1, wherein the drive controller is further configured to reset the stationary energization phase, according to the motor rotational speed when the motor angle reaches a motor angle target value, and wherein the motor angle target value is set based on the target shift range.

4. The shift range control apparatus according to claim 1, wherein the drive controller is configured to shift the stationary energization phase from the energization phase corresponding to a motor angle target value.

5. The shift range control apparatus according to claim 4, wherein the drive controller is further configured to determine an amount of the shift of the stationary energization phase from the energization phase corresponding to the motor angle target value based on the motor rotational speed.

* * * * *